UNITED STATES PATENT OFFICE.

HENRY ALBERT HUGHES, OF PHILADELPHIA, PENNSYLVANIA, ASSIGNOR TO THE PERFECTION JAR CLOSURE COMPANY, OF SAME PLACE AND CAMDEN, NEW JERSEY.

SEALING-WAX.

SPECIFICATION forming part of Letters Patent No. 664,752, dated December 25, 1900.

Application filed October 19, 1900. Serial No. 33,646. (No specimens.)

*To all whom it may concern:*

Be it known that I, HENRY ALBERT HUGHES, a citizen of the United States, residing in Philadelphia, Pennsylvania, have invented certain Improvements in Sealing Compounds, of which the following is a specification.

My invention consists of an improved composition of matter to be used as a sealing compound for the closures of jars or bottles—such, for instance, as shown in my Patent No. 656,548, dated August 21, 1900.

My improved sealing compound is composed of the following ingredients: paraffin, resinous gum, such as dammar or copal, and lard or other animal or vegetable oil or fat. These ingredients are combined in about the following proportions: paraffin, (commercial,) two hundred pounds; resinous gum, (dammar or copal,) twenty pounds; oil or fat, (animal or vegetable,) two and one-half ounces.

In making my compound I preferably proceed as follows: The paraffin is melted in a suitable vessel and when in a highly-heated state—say between 50° and 60° centigrade—the gum is added thereto and the temperature of the paraffin is raised to 150° centigrade until the gum is melted, it being understood that the gum requires a greater degree of heat than the paraffin. After this mixture has become entirely fluid the oil or fat is added and the composition is ready for use. In some instances, however, I may combine the oil or fat with the paraffin before the gum is added to the mixture.

The addition of the oil or fat is for the purpose of effecting a proper union of the paraffin and gum, especially if the latter be partially or entirely oxidized, a further object of the oil or fat being to decrease the brittleness of the paraffin and gum when such composition hardens and to increase the stickiness of the compound.

Some of the resinous gums have essential oils combined therewith, and if these gums are used when fresh (before oxidization takes place) they will combine with the paraffin, such essential oils increasing the affinity of the gum for the paraffin; but while the intimate mixture of the gum and paraffin will be aided by these essential oils the resulting compound will be too brittle for practical use, and to insure the proper mixture of the gum and paraffin, as well as to give the compound the proper degree of stickiness, the oil or fat is added. On the other hand, if the gums used are oxidized to a large extent they will not combine with the paraffin, but when melted will float in separate layers within the molten mass of paraffin, and to secure the proper union of said gums with the paraffin I employ the oil or fat.

The proportions named herein have been employed in making a sealing compound for the covers of jars or bottles, and it has been found to withstand the action of fruit and vegetable acids and the salt water in which olives are packed, as well as the mixture of oil, vinegar, and mustard in which some food products are preserved.

Having thus described my invention, I claim and desire to secure by Letters Patent—

1. The herein-described composition of matter consisting of paraffin, dammar gum, and an oil or fat.

2. The herein-described composition of matter consisting of paraffin, dammar gum, and lard-oil, in about the proportions named.

In testimony whereof I have signed my name to this specification in the presence of two subscribing witnesses.

HENRY ALBERT HUGHES.

Witnesses:
MURRAY C. BOYER,
JOS. H. KLEIN.